United States Patent [19]

Kimisawa

[11] Patent Number: 5,332,347
[45] Date of Patent: Jul. 26, 1994

[54] MAT FASTENER

[75] Inventor: Toshihide Kimisawa, Utsunomiya, Japan

[73] Assignee: Nifco, Inc., Yokohama, Japan

[21] Appl. No.: 73,330

[22] Filed: Jun. 8, 1993

[30] Foreign Application Priority Data

Jun. 10, 1992 [JP] Japan .......................... 4-050353[U]

[51] Int. Cl.5 .................................................. F16B 37/04
[52] U.S. Cl. .................................. 411/182; 411/435; 411/437; 411/508
[58] Field of Search ............... 411/520, 437, 526, 182, 411/913, 512, 508, 172, 173, 174, 175, 349, 435; 24/453, 295; 248/74.3, 71

[56] References Cited

U.S. PATENT DOCUMENTS

| 3,309,955 | 3/1967 | Turnbull et al. | 411/349 X |
| 4,393,551 | 7/1983 | Wollar et al. | 411/349 X |
| 4,781,504 | 11/1988 | Yuta | 411/508 X |
| 4,810,147 | 3/1989 | Hirohata | 411/508 X |
| 4,828,444 | 5/1989 | Oshida | 411/512 X |
| 4,850,773 | 7/1989 | Asami | 24/453 X |

FOREIGN PATENT DOCUMENTS 2919023 11/1980 Fed. Rep. of Germany ...... 411/508

Primary Examiner—Rodney M. Lindsey
Attorney, Agent, or Firm—Schwartz & Weinrieb

[57] ABSTRACT

A mat fastener comprises a cylindrical main body having a central insertion hole and engagement claws projecting from the inner surface of the insertion hole, a retainer provided around the lower periphery of the cylindrical body defining the main body and consisting of a pair of vertically spaced upper and lower retaining members, and an operating member provided on the upper periphery of the main body or the upper retaining member.

12 Claims, 5 Drawing Sheets

MAT FASTENER

BACKGROUND OF THE INVENTION

1. Field of the Invention

This invention relates to a mat fastener for detachably fastening a mat or mat-like object to a panel by means of a stud bolt projecting from the panel, and more particularly to a mat fastener useful for fastening a mat or mat-like object such as, for example, a vehicle engine compartment insulator or a passenger compartment floor mat to a wall or floor panel.

2. Prior Art Statement

Typical fasteners conventionally used for fastening mats to floors, walls, and the like, are plastic moldings comprising a flange-like head member having a downwardly extending leg member equipped with an engagement claw. When the fastening operation using such fasteners has to be conducted in a confined space, however, it becomes extremely troublesome and time consuming. In particular, since the attachment of such types of mats requires fastening of the same at numerous points, the legs of the individual fasteners have to be passed through the holes provided in the mat one by one and, further, have to be individually pressed into fastening holes provided in the floor or wall panel. This work is highly troublesome and is made even more so by the fact that it is frequently difficult to find the holes into which the leg members have to be inserted. As a result, defective mat fastening is not uncommon.

OBJECT OF THE INVENTION

The present invention was developed in light of the foregoing circumstances and has as its object the provision of a mat fastener which advantageously utilizes the fastening holes provided in a mat for attaching mat fasteners to the mat so as to facilitate the work of reliably fastening the mat to a panel (wall, floor or the like) at a plurality of points and which, by being made detachable from the panel, further facilitates the work of maintaining and replacing the mats.

SUMMARY OF THE INVENTION

For achieving the aforesaid object, this invention provides a mat fastener comprising:
- a cylindrical main body having a central insertion hole for passage of a stud bolt and engagement claws projecting from the inner surface of the main body defining the insertion hole for engaging the stud bolt,
- a retainer provided around the lower periphery of the main body and consisting of a pair of upper and lower flange-like retaining members spaced by a distance appropriate relative to the thickness of a mat to be fastened, the lower retaining member having a guide notch of a width greater than the thickness of the mat extending radially inward from its periphery, and
- an operating member for twisting the main body provided on the upper periphery of the main body or on the upper surface of the upper retaining member.

The mat fastener according to this invention is molded from a synthetic resin exhibiting a prescribed degree of rigidity and elasticity and may, for example, be molded from a thermoplastic synthetic resin such as nylon. The molding is preferably conducted in such manner that the lower one of the pair of retaining members constituting the retainer is imparted with elasticity and flexibility by being formed to a smaller thickness than the upper retaining member.

In addition, it is preferable to form the lower retaining member so that its edge on one side of the guide notch projects further than that on the other side thereof, whereby the further projecting edge has greater flexibility.

When the mat fastener according to the invention is used for fastening a mat or mat-like object such as an insulator, the lower retaining member of the retainer is first brought opposite a fastening hole previously formed in the mat Then, after the guide notch formed in the lower retaining member has been brought opposite the periphery of the fastening hole, the retaining member is pressed against the fastening hole periphery so as to cause one edge of the guide notch to pass through the fastening hole to the underside of the mat. With the mat fastener held in this state, the operating member is rotated so as to cause the entire periphery of the lower retaining member to be disposed beneath the mat. Since the periphery of the fastening hole is therefore sandwiched between the upper and lower retaining members, the mat fastener is attached to the mat so as to be rotatable with respect to thereto. A mat fastener is attached at every hole in the mat in the same manner. The mat (insulator) with the mat fasteners attached thereto is then brought opposite the wall such as, for example, (an automobile engine compartment panel) to which it is to be fastened in such manner that the insertion hole of each main body faces a stud bolt projecting from the wall (panel) surface. The main bodies are then pressed onto the stud bolts to force the stud bolts into the insertion holes and cause the engagement claws of each mat fastener to engage with the thread of the bolt. When this work is completed for all of the mat fasteners, the mat is fastened to the wall (panel) so as to be incapable of being stripped off.

When it is desired to detach the mat fastened in the foregoing manner, it suffices to turn each of the mat fasteners by its operating member. This causes the engagement claws to move along the threads until the mat fastener is threadedly disengaged from the stud bolt while remaining attached to the mat. The mat can then be removed from the wall (panel).

BRIEF DESCRIPTION OF THE DRAWINGS

The above and other features of the present invention will become apparent from the following description, when considered with reference to the following drawings, in which like reference characters designate like or corresponding parts throughout the several views, and wherein.

DESCRIPTION OF THE PREFERRED EMBODIMENTS

The drawings show an embodiment of the mat fastener according to the invention, in which reference symbol 1 designates a cylindrical main body having a vertical insertion hole 2 at its center, 3 and 4 are engagement claws formed by making inverted U-shaped cuts into the periphery of the main body and forcing the cut portions to project into the insertion hole, 5 is a retainer formed at the lower periphery of the main body by upper and lower retaining member 6 and 7, and 8 is an operating member formed to project symmetrically from opposite sides of the upper half of the periphery of the main body.

Figure 9:
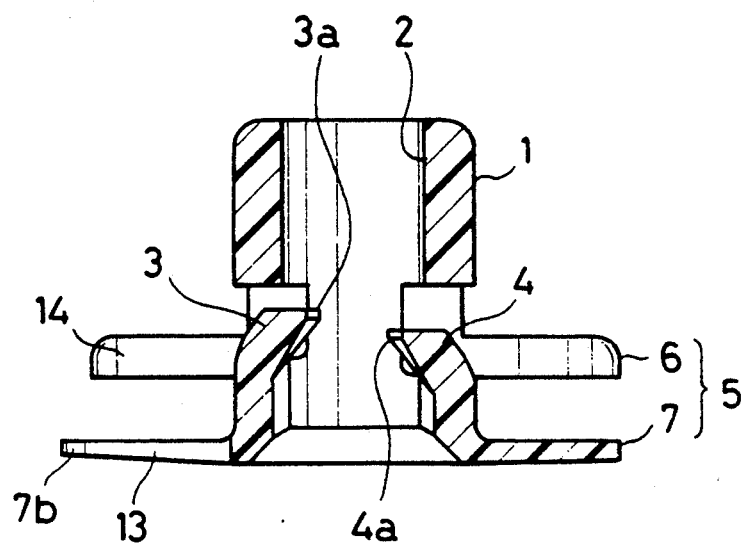
FIG. 9 is a sectional view taken along line 9—9 in FIG. 7.

The cylindrical main body 1 is formed to a size enabling its insertion hole 2 to be fitted over a stud bolt 10 projecting from a panel 9 to which a mat is to be fastened. The engagement claws 3, 4 formed by forming cuts in the wall of the main body 1 project obliquely upwardly into the insertion hole. The tips thereof form arcuate claws 3a, 4a (FIG. 9).

The engagement claws 3, 4 engage with the thread formed on the periphery of the stud bolt so as to prevent the main body from being pulled off the stud bolt. So as to increase their bite with respect to the stud bolt, they are formed by cutting into a lower portion of the main body wall. In addition, they are formed at diametrically opposite positions relative to the axis of the main body and, to enable them both to engage with the helical thread, the engagement claw 3 is offset axially upwardly relative to claw 4.

The upper and lower retaining members 6 and 7 constituting the retainer 5 are flange-shaped members that extend laterally and in parallel with respect to each other and are separated by a space suitable in light of the thickness of the mat, which, in the illustrated example, is an insulator 11. As shown in the drawings, the upper retaining member 6 is made thicker so as to be relatively rigid, while the lower retaining member 7 is made thinner so as to be relatively elastic. In addition a part of the lower retaining member 7 is cut away to form a guide notch 13 which extends from the edge of the lower retaining member 7 to near the periphery of the main body.

Figure 8:
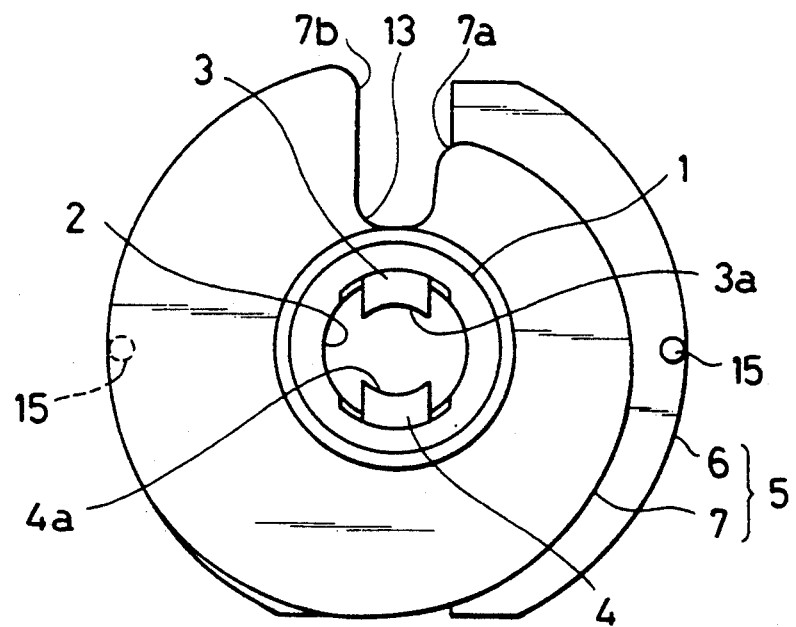
FIG. 8 is a bottom plan view of the mat fastener of FIG. 1.

The guide notch 13 is a means for guiding the lower retaining member 7 into a fastening hole 12 of the insulator 11. As shown best in FIG. 8, the edge 7a on one side of the guide notch 13 is formed so as to project radially outwardly by a shorter distance than the edge 7b on the other side of the guide notch 13, and the radial distance to the peripheral edge portion interconnecting the edges 7a and 7b is gradually increased from the side of the edge 7a to the side of the edge 7b so as to give the lower retaining member 7 a continuous generally circular shape. It is further preferable to gradually decrease the thickness of the lower retaining member 7 from the edge 7a to the edge 7b.

The operating member 8 is a means for enabling easy rotation of the main body 1 by means of an operator's fingers. In this embodiment, it is formed by means of a pair of oppositely disposed ears extending laterally from the upper periphery of the main body. It can instead be formed of a pair of similar members rising from the upper surface of the upper retaining member 6 of the retainer 5. It can also be constituted of three or more members.

As will be explained later, after the mat fastener has been engaged with the stud bolt 10, the operating member 8 can be used to rotate the mat fastener for detaching it from the stud bolt. Its members (ears) are therefore formed in a size for easy gripping with one's fingers.

Reference symbols 14 in the drawings designate a pair of notches cutting across the upper retaining member 6 of the retainer 5. These notches are left by the die used for forming the engagement claws 3, 4. Reference symbols 15 designate grip projections protruding from the underside of the upper retaining member 6.

When the mat fastener configured in the foregoing manner is to be used, the retainer 5 is first brought opposite one of the fastening holes 12 previously formed in the insulator 11 at prescribed locations. The edge 7b of the guide notch 13 of the lower retaining member 7, namely the one of the two guide notch edges that extends further outwardly, is brought into contact with the upper surface of the insulator and the other edge 7a, which extends outwardly by a shorter distance, is brought opposite the fastening hole 12. With the mat fastener held in this manner, the main body 1 is maneuvered with respect to the insulator 11 so as to pass the edge 7a through the fastening hole 12 to the underside of the insulator 11 and catch the periphery of the fastening hole in the guide notch 13. The main body 1 is then rotated so as to pass the lower retaining member 7 under the insulator 11 and catch the insulator 11 between the lower retaining member 7 and the upper retaining member 6.

Figure 1:
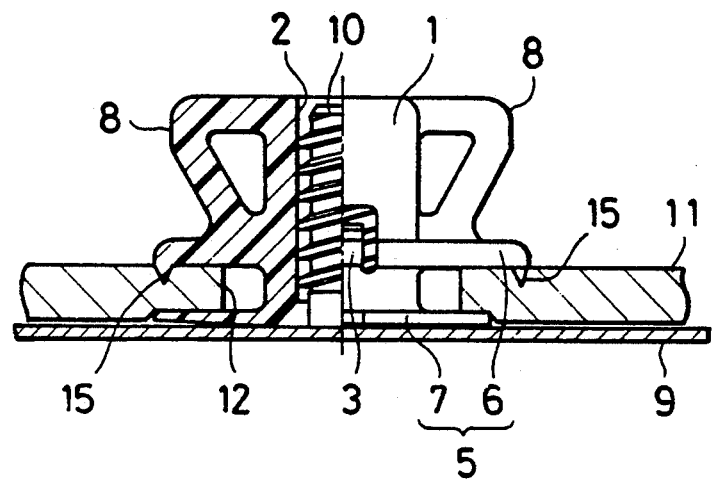
FIG. 1 is a front view, in section on the left side, of an embodiment of the mat fastener of the present invention showing the mat fastener in use.
Figure 2:
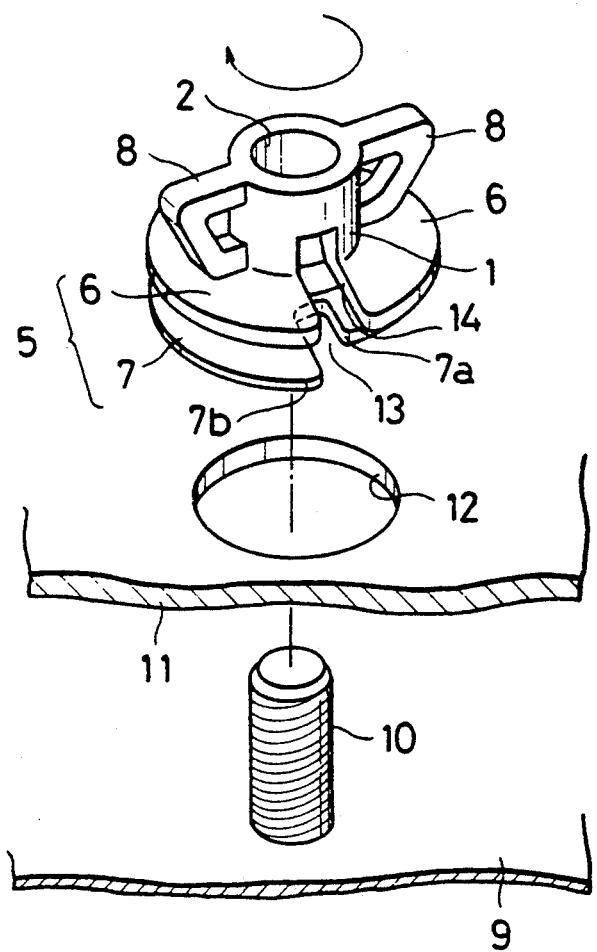
FIG. 2 is a perspective view of the mat fastener of FIG. 1 showing the mat fastener positioned for attachment to a mat and a stud bolt.
Figure 3:
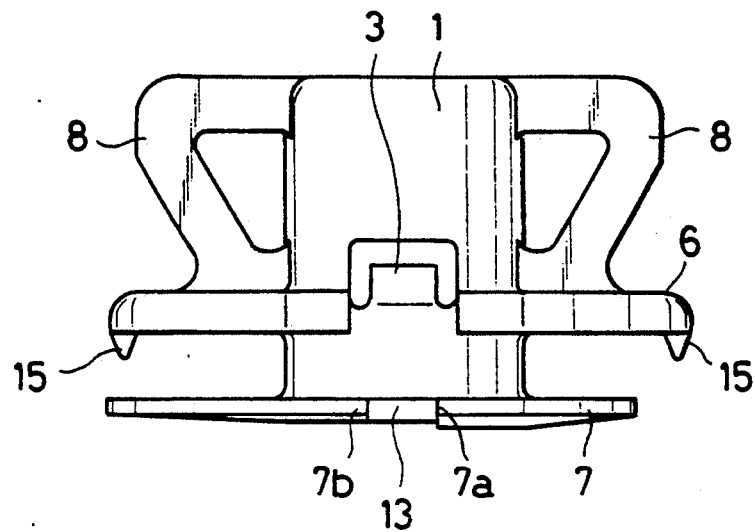
FIG. 3 is a front view of the mat fastener of FIG. 1.
Figure 4:
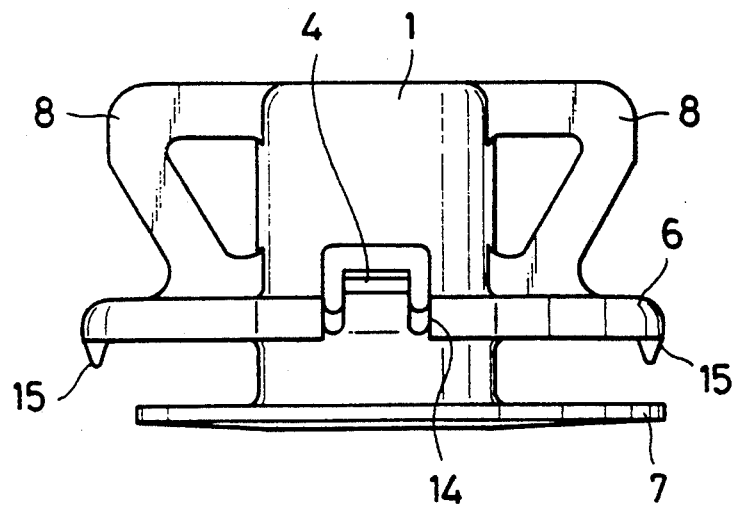
FIG. 4 is a rear view of the mat fastener of FIG. 1.
Figure 5:
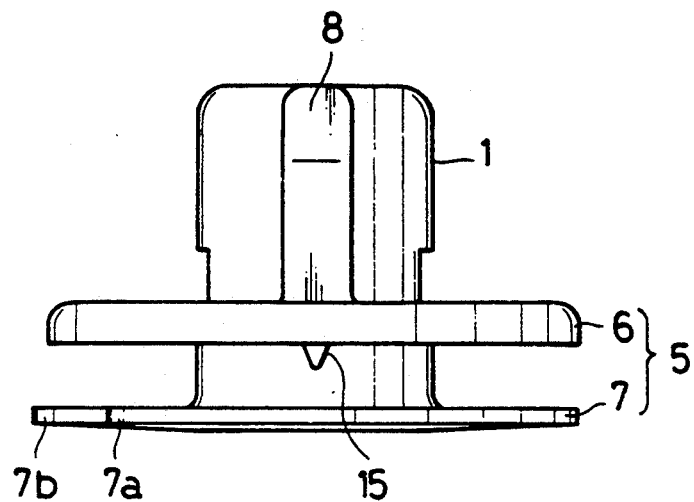
FIG. 5 is a right side view of the mat fastener of FIG. 1.
Figure 6:
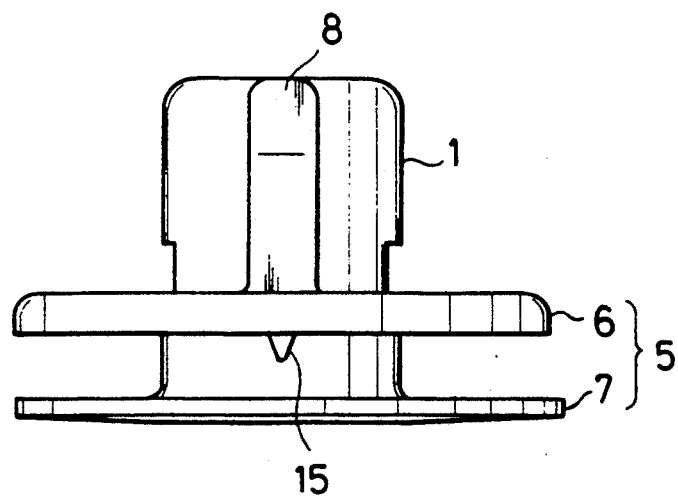
FIG. 6 is a left side view of the mat fastener of FIG. 1.
Figure 7:
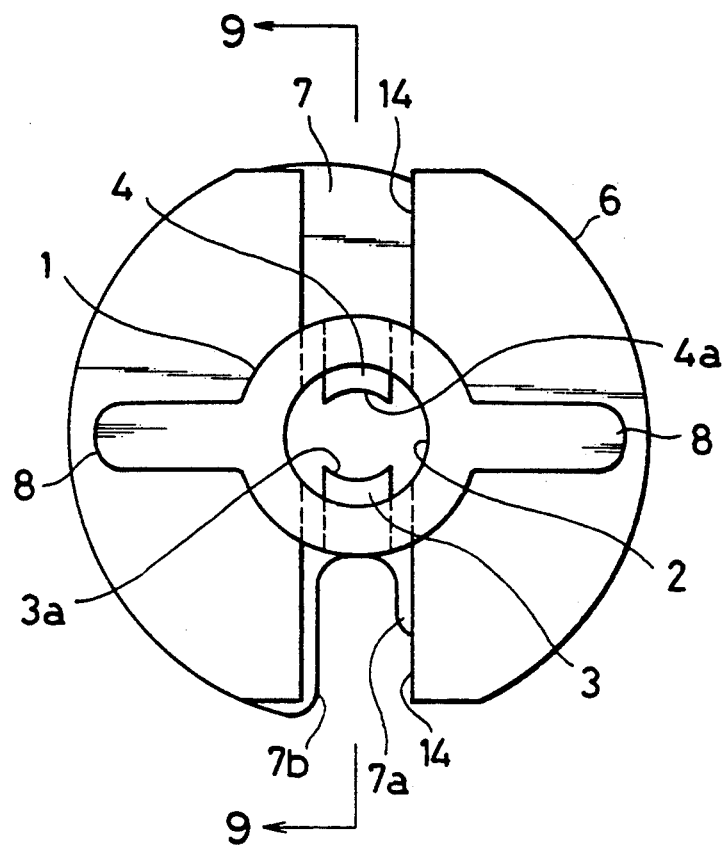
FIG. 7 is a top plan view of the mat fastener of FIG. 1.

More specifically, when the main body 1 is moved toward the fastening hole 12, the shorter edge 7a passes through the fastening hole 12 without interference while the longer edge 7b abuts on the upper surface of the insulator. Therefore, as the main body 1 is pushed further, the portion of the lower retaining member 7 in the vicinity of the edge 7b flexes away from the edge 7a until the two are separated vertically by a distance approximately equal to the thickness of the insulator 11. The flexing of the lower retaining member 7 at this time is made easier by the fact that the lower retaining member 7 is made thinner at the edge 7b than at the edge 7a. As a result, the edge 7a can pass to the underside of the insulator 11 with substantially no interference. Then when the main body 1 is rotated by the operating member 8 in the direction causing the edge 7a to advance (in the direction indicated by the arrow in FIG. 2), the lower retaining member 7 works its way through the fastening hole 12 guided by its circular periphery until, after approximately one turn, member 7 fully emerges on the underside of the insulator 11 so as to sandwich the region surrounding the fastening hole 12 between lower retaining member 7 and the upper retaining member 6. This completes the attachment of the mat fastener to the insulator 11.

When the mat fastener is attached to the insulator 11 in this manner, it cannot thereafter be rotated freely since the grip projections 15 on the undersurface of the upper retaining member 6 bite into the upper surface of the insulator 11. Notwithstanding this, the fastener can be rotated if enough force is applied so as to overcome the resistance of the engagement between the grip projections 15 and the insulator 11.

After a mat fastener has been similarly attached at each of the fastening holes 12 of the insulator 11, the insulator 11 is brought opposite the panel 9 and aligned therewith such that the insertion hole 2 of each main body 1 is opposed to one of the stud bolts 10 projecting from prescribed locations on the panel 9. The upper ends of the main bodies 1 are then pressed toward the panel 9 so as to force the stud bolts 10 into the insertion holes 2, whereby the engagement claws 3, 4 automatically engage with the threads of the stud bolts 10 so as to complete the fastening of the insulator to the panel.

An insulator is normally fastened to a panel at a plurality of points. This invention facilitates the fastening work in such cases because it enables the mat fasteners to be attached to the insulator beforehand by inserting them into the fastening holes 12 formed in the insulator in a prescribed pattern. This makes it possible to fasten the insulator to the panel simply by spreading the insulator over the panel in the prescribed position and orientation and then pressing the mat fasteners onto the associated stud bolts so as to automatically complete the fastening operation.

If it should become necessary to detach an insulator fastened to a panel using the mat fasteners according to the invention, this can be accomplished by grasping the operating member 8 of each mat fastener and rotating the main body so as to cause it to move up and off the stud bolt as the claws 3a, 4a of the engagement claws 3, 4 move the bolt thread. Although a fair amount of turning force is required at this time because of the engagement of the grip projections 15 with the upper surface of the insulator, the detachment can readily be realized without breaking the mat fasteners. Moreover, since the mat fasteners remain attached to the insulator by the retainers 5, they can be used for refastening the insulator.

As is clear from the foregoing detailed description of the embodiment illustrated in the drawings, since the mat fastener according to the invention can be attached to a mat or mat-like object such as an insulator or a floor mat using fastening holes provided in the mat or mat-like object, during the operation of fastening the mat or mat-like object to a wall, panel or the like, there is no need, as there is in the case of conventional fasteners, to search for the fastening holes or to grope with the hand to confirm the fastening positions on the wall or panel. Moreover, since the fastening can be achieved simply by pressing each mat fastener onto the associated stud bolt, the fastening operation can be conducted with high reliability substantially unaffected by the amount of working space available.

In addition, the mat fastener according to the invention is on the one hand able to exhibit strong fastening power owing to the high resistance to movement in the direction of detachment provided by the engagement between the engagement claws and the bolt thread. However, since it is on the other hand capable of being threadedly engaged with the thread and removed from the bolt in such condition as to be able to be later pressed back onto the bolt for reestablishing the fastened state, it facilitates the work of maintaining and replacing mats and mat-like objects.

Obviously, many modifications and variations of the present invention are possible in light of the above teachings. It is therefore to be understood that within the scope of the appended claims, the present invention may be practiced otherwise than as specifically described herein.

What is claimed is:

1. A mat fastener for securing a mat to a support panel, comprising:
   a cylindrical main body having a central insertion hole defined therethrough, such that said cylindrical main body comprises a tubular body for receiving and passing therethrough a stud bolt projecting from said support panel; and engagement claws, projecting radially inwardly from inner peripheral surface portions of said tubular body defining said central insertion hole, for engaging said stud bolt;
   a retainer provided around a lower, outer peripheral portion of said main body and comprising a pair of upper and lower flange-like retaining members axially spaced apart with respect to each other by a distance which corresponds to the thickness of said mat to be fastened to said support panel, said lower retaining member having a guide notch, of a width greater than said thickness of said mat, extending radially inwardly from an outer peripheral portion of said lower retaining member; and
   radially outwardly extending operating means mounted upon upper, oppositely disposed, outer peripheral portions of said tubular body for rotating said main tubular body and said retainer such that said lower retaining member can be entirely disposed beneath said mat, whereby said mat is interposed between said upper and lower retaining members, after a peripheral edge portion of a hole of said mat has been inserted within said guide notch of said lower retaining member, and said tubular body and said retainer have been rotated substantially a complete turn by said radially outwardly extending operating means.

2. A mat fastener according to claim 1, wherein the lower retaining member of the retainer is imparted with elasticity.

3. A mat fastener according to claim 1, wherein:
   said lower retaining member of said retainer is imparted with elasticity and is formed such that one edge portion thereof which defines said guide notch has a predetermined radial extent, and another edge portion thereof which also defines said guide notch has a predetermined radial extent which is greater than said predetermined radial extent of said one edge portion, whereby the flexibility of said lower retaining member is enhanced within the vicinity of said another edge portion of said lower retaining member.

4. A mat fastener according to claim 3, wherein the thickness the lower retaining member is smaller at said another edge portion than at said one edge portion.

5. A mat fastener as set forth in claim 1, wherein:
   said engagement claws comprise substantially U-shaped cutout portions defined within peripheral portions of said tubular body.

6. A mat fastener as set forth in claim 1, wherein:
   said engagement claws comprise arcuate claw portions for engaging threaded portions of said stud bolt.

7. A mat fastener as set forth in claim 1, wherein:
   said engagement claws are formed within diametrically opposite portions of said tubular body.

8. A mat fastener as set forth in claim 6, wherein:
   said arcuate claw portions are axially offset with respect to each other so as to engage said threaded portions of said stud bolt.

9. A mat fastener as set forth in claim 4, wherein:

said thickness of said lower retaining member is gradually reduced as one proceeds around the periphery of said lower retaining member in the direction extending from said one edge portion to said another edge portion.

10. A mat fastener as set forth in claim 1, further comprising:

projection means projecting downwardly from said upper retaining member for engaging upper surface portions of said mat when said mat fastener has been mounted upon said mat with said mat interposed between said upper and lower retaining members.

11. A mat fastener as set forth in claim 1, wherein:
said mat fastener is fabricated from a thermoplastic synthetic resin material.

12. A mat fastener as set forth in claim 11, wherein:
said thermoplastic synthetic resin material comprises nylon.

* * * * *